(12) United States Patent
Kleiber

(10) Patent No.: US 6,414,632 B1
(45) Date of Patent: Jul. 2, 2002

(54) MONITORING OF THE PHASE ANGLE OF COURSE AND CLEARANCE SIGNALS IN AN INSTRUMENT LANDING SYSTEM

(75) Inventor: Herbert Kleiber, Ludwigsburg (DE)

(73) Assignee: Airsys Navigation System GmbH, Stuttgart (DE)

( * ) Notice: Subject to any disclaimer, the term of this patent is extended or adjusted under 35 U.S.C. 154(b) by 0 days.

(21) Appl. No.: 09/743,814

(22) PCT Filed: May 21, 1999

(86) PCT No.: PCT/IB99/00931

§ 371 (c)(1),
(2), (4) Date: Jan. 22, 2001

(87) PCT Pub. No.: WO00/72040

PCT Pub. Date: Nov. 30, 2000

(30) Foreign Application Priority Data

Dec. 18, 1997 (DE) .......................................... 197 56 364

(51) Int. Cl.⁷ .............................. G01S 1/16; G01S 7/40
(52) U.S. Cl. ....................................... 342/413; 342/173
(58) Field of Search ........................... 342/413, 33, 34, 342/35, 173

(56) References Cited

U.S. PATENT DOCUMENTS

| | | |
|---|---|---|
| 4,387,375 A | 6/1983 | Kleiber et al. |
| 4,506,332 A | 3/1985 | Bloch et al. |
| 4,940,984 A | 7/1990 | Kleiber |
| 5,130,716 A | 7/1992 | Kleiber |
| 5,153,587 A | * 10/1992 | Redlich ........................ 342/413 |
| 5,248,983 A | 9/1993 | Kleiber et al. |
| 6,097,338 A | 8/2000 | Rupprecht et al. |

FOREIGN PATENT DOCUMENTS

| | | |
|---|---|---|
| DE | 197 56 364 | 6/1999 |
| EP | 0 810 447 | 12/1997 |

OTHER PUBLICATIONS

Christoph Pfuhl, et al., Electrical Communication, pp. 41–50, "40 Years of Using Instrument Landing Systems (ILS)", 1993.

* cited by examiner

Primary Examiner—Thomas H. Tarcza
Assistant Examiner—Fred H. Mull
(74) Attorney, Agent, or Firm—Oblon, Spivak, McClelland, Maier & Neustadt, P.C.

(57) ABSTRACT

A method for monitoring a localizer course facility in an instrument landing system, including modulating a course signal at a first signal frequency and at a second signal frequency, and transmitting the modulated course and clearance signals. The method also includes detecting by sensors the modulated course and clearance signals, demodulating the modulated course and clearance signals, monitoring variables obtained from the demodulated course and clearance signals to ensure that the variables are within limit values, and subjecting the demodulated course and clearance signals to Fourier transformation. Also included is determining a first phase difference for a first modulation frequency between the course and clearance signals detected by the sensors and a second phase difference for a second modulation frequency in the course and clearance signals, betweem the course and clearance signals detected by the sensors. Further, the phase differences which have been determined for the first and second modulation frequencies are compared with the limit values provided for each of these differences and a warning signal is produced if the limit values are infringed.

3 Claims, 1 Drawing Sheet

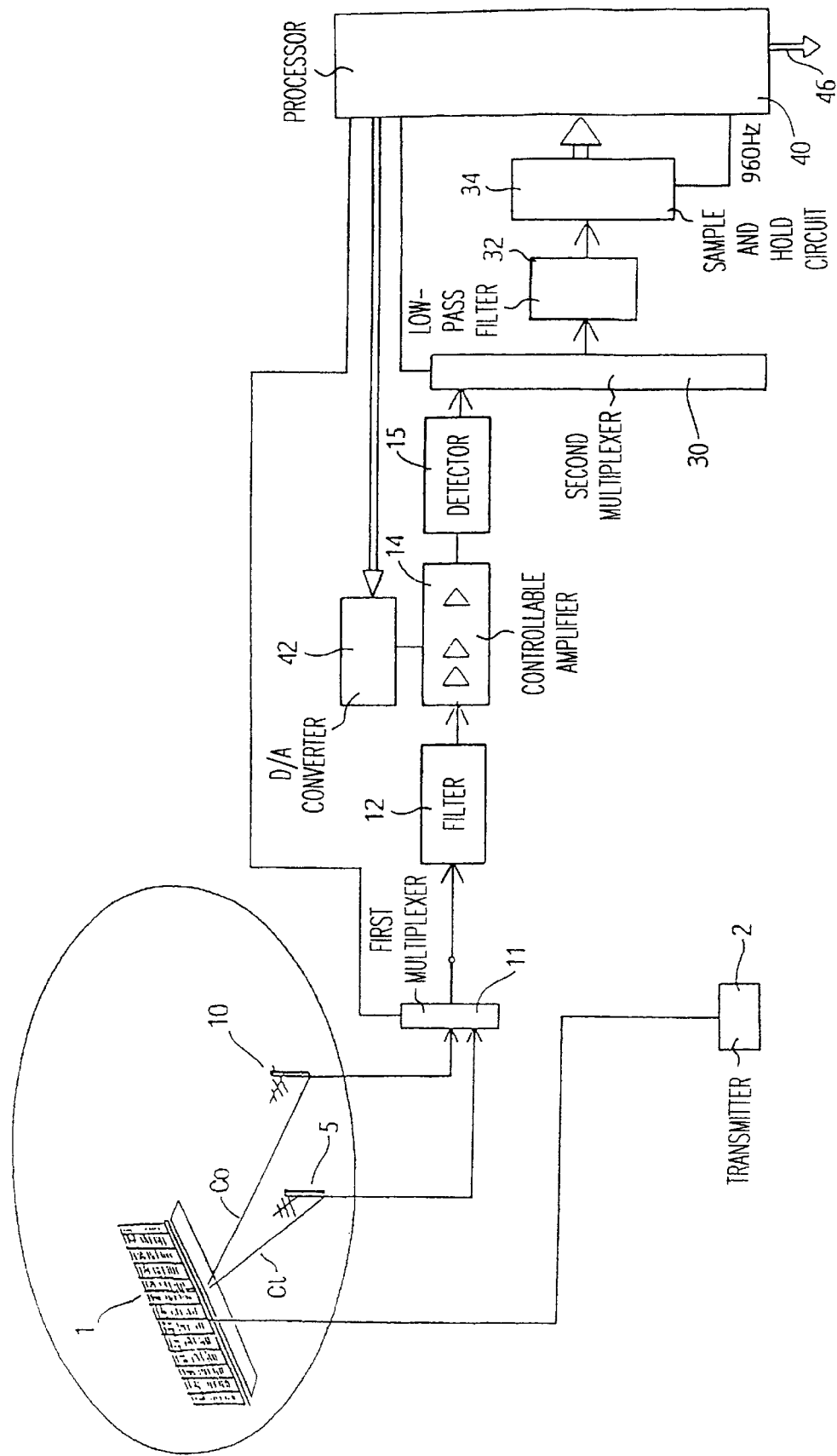

MONITORING OF THE PHASE ANGLE OF COURSE AND CLEARANCE SIGNALS IN AN INSTRUMENT LANDING SYSTEM

BACKGROUND OF THE INVENTION

Field of the Invention

The invention relates to a monitoring method and device for signals for a localizer course transmission system.

DISCUSSION OF THE BACKGROUND

Monitoring methods and devices are in normal use in instrument landing systems, since signals must be monitored in order to ensure that these systems are operating safely. It is thus known for the guidance signals which are transmitted via the localizer antenna from the localizer course transmitter to be checked to confirm that they are within specific, predetermined error limits.

In order to at least partially compensate for interference influences from relatively large reflective objects (for example hangars) at the side of the runway on the course signal received by an aircraft approaching the runway, it is known for a phase shift other than the conventional value of 0° to be provided between the modulation signals for the course signal on the one hand and the clearance signal on the other hand so that, in one specific case for example, a phase shift of 94° may be provided in order to take account of the abovementioned hangars for a specific runway. This is referred to as out-of-phase clearance.

SUMMARY OF THE INVENTION

The invention is based on the object of monitoring, in a simple manner, to ensure that such a phase shift is maintained.

One advantage of the invention is that the process of determining the phase shift means that any discrepancies, which may occur as a result of the errors occurring in the system or for reasons relating to maladjustment or incorrect operation can be detected quickly, in order that such discrepancies can then be compensated for. The method can be carried out in a particularly simple manner by joint use of those components (sensors and field dipole antennas, processors, digitizers etc.) which are already present in conventional monitoring devices, so that it leads to only minor additional costs.

It is particularly advantageous for the signals to be processed digitally by means of a digital processor.

Further features and advantages of the invention will become evident from the following description of an exemplary embodiment of the invention with reference to the drawing, which shows details essential to the invention. The individual features may each be implemented individually or in any desired combination of a number of them, in one embodiment of the invention.

BRIEF DESCRIPTION OF THE DRAWINGS

The single drawing shows a circuit diagram of a monitoring device for signals for a localizer course transmission system.

DESCRIPTION OF THE PREFERRED EMBODIMENTS

Monitoring of a conventional instrument landing system requires a sensor for the course signal Co, and a sensor for monitoring the clearance signal Cl. Until now, an integral sensor (not a field sensor) has been used for the latter purpose, being arranged on the antenna arrangement. In the exemplary embodiment, dipole antennas (monitor antennas) are used as sensors. The course dipole antenna, is located at a distance of about 80 meters from the antenna arrangement 1, and the antenna of the clearance monitor is located, offset in a corresponding manner to one side, at a distance of about 150 meters from the antenna arrangement 1. For simplicity, the drawing does not show the different distance.

The antenna arrangement 1, which in the example is formed from a large number of dipoles, is fed from a transmitter 2, which supplies the course signal and the clearance signal to the antenna arrangement.

A first monitor antenna 5 (or sensor) for detecting the clearance signal Cl is positioned approximately 150 m to the side in front of the antenna arrangement 1, and a further monitor antenna 10 for detecting the course signal Co is positioned at a distance of about 80 meters in front of the antenna arrangement 1. Both sensors supply their received signals via a first multiplexer 11 to the input of a radio-frequency filter 12, whose output is connected via a controllable amplifier 14 to the input of a precision detector 15, which demodulates the signal from the sensor 5 or 10, and supplies this signal to an input of a second multiplexer 30.

As is known, the two signal frequencies used for modulating the radio frequency of the course signal and clearance signal transmitted from the antenna 1 are 90 Hz and 150 Hz. The output signals from the precision detector 15 and, if required, other signals as well, are passed on from the second multiplexer 30, are passed via a low-pass filter 32 with a cut-off frequency of 300 Hz, and are supplied to a sample and hold circuit 34 having an analog/digital converter, with 12 bits in the exemplary embodiment. Sampling is carried out at 960 Hz. The digital signal is supplied to one input of a microprocessor which, in the example, is a Type 80C186 with peripheral and control devices. A digital output signal from this processor 40 is supplied to a 12-bit digital/analog converter 42, which supplies the amplifier 14 with a control signal for automatic gain control, in order that the processor is fed with sufficiently constant pulse amplitudes. A monitoring output 46 of the processor 40 supplies the monitor data to a serial interface, which is supplied to an evaluation device (not shown) which then initiates the necessary actions if the permissible limit values have been infringed. The processor 40 also supplies the 960 Hz clock frequency for the sample and hold circuit.

The processor 40 carries out a discrete Fourier transformation (DFT) on the samples supplied to it, and uses this to obtain the real part and the imaginary part of the demodulated signal from the sensors 5 and 10.

The processor 40 is configured in such a way that it determines the phase shift between the course signal and the clearance signal for the first modulation frequency, and also determines the phase shift between the two said signals for the second modulation frequency. The phase shift is determined by determining the ratio of the imaginary part to the real part of the individual frequencies (the imaginary part and the real part are determined in any case during the DFT) for both modulation frequencies and for each of the two signals received from the two sensors. The arctan of the respective ratio is then the phase of the respective signal.

The difference in the phases, for example, of the first modulation frequency of 90 Hz between the two signals (course signal and clearance signal) then gives the phase shift for the first modulation frequency, which is compared with the appropriate limit values. The same is done for the second modulation frequency. On approaching the permissible limits, particularly if they are infringed, the processor 40 causes an alarm signal or warning signal to be emitted.

The first multiplexer 11 is switched on by the microprocessor 40 at a suitable channel selection clock frequency, depending on the number of signals to be passed on. In addition to the two signals shown in the figure, further signals may also be passed on, if required. Each signal from the two sensors 5 and 10 is passed on for a sufficiently long time period for the digitizer 34 to take a total of 40 samples. The first eight samples are ignored, since they may be subject to error due to transient processes. The remaining 32 samples, which correspond to a complete 30 Hz period of the signal formed from the 90 Hz signal and 150 Hz signal, are processed further, digitally, in the processor 40.

Instead of using antennas to receive said signals, it would be technically feasible to obtain these signals by means of other sensors, for example directly from cables carrying the desired signals.

What is claimed as new is:

1. A method for monitoring a localizer course facility in an instrument landing system, comprising:

modulating a course signal at a first signal frequency and at a second signal frequency;

modulating a clearance signal at the first signal frequency and at the second signal frequency;

transmitting the modulated course and clearance signals;

detecting by sensors the modulated course and clearance signals;

demodulating the molded course and clearance signals;

monitoring variables obtained from the demodulated course and clearance signals to ensure that said variables are within limit values;

subjecting the demodulated course and clearance signals to Fourier transformation;

determining a first phase difference for a first modulation frequency between the course and clearance signals, detected by the sensors and a second phase difference for a second modulation frequency in the course and clearance signals, between the course and clearance signals detected by the sensors;

comparing the phase differences which have been determined for the first and second modulation frequencies with the limit values provided for each of these differences; and producing a warning signal if the limit values are infringed.

2. The method as claimed in claim 1, wherein the Fourier transformation, the determination of the phase differences, and the comparison with the limit values are performed after a production of a digitized, demodulated signal from the sensors using digital data processing.

3. An arrangement for monitoring a localizer course facility in an instrument landing system, comprising:

a modulator configured to modulate course and clearance signals at a first signal frequency and at a second signal frequency and;

a transmitter configured to transmit the modulated course and clearance signals;

a detector configured to detect the modulated course and clearance signals;

a demodulator configured to monitor the course and clearance signals; and processor configured to monitor variables obtained from the demodulated course and clearance signals to ensure that the course and clearance signals are within limit values, wherein the modulated course and clearance signals are supplied to a first multiplexer which is controlled by the processor, an output of the first multiplexer is coupled to an input of the demodulator whose output is coupled to an input of a second multiplexer whose output is coupled to an input of a digitization device whose output signal is supplied to a signal input of the processor configured in such a way that said processor determines phase differences for two modulation frequencies between the course and clearance signals received by two sensors and compares said phase differences with the limit values.

* * * * *

UNITED STATES PATENT AND TRADEMARK OFFICE
CERTIFICATE OF CORRECTION

PATENT NO.       : 6,414,632 B1                                                                Page 1 of 1
DATED            : July 2, 2002
INVENTOR(S)      : Kleiber It is certified that error appears in the above-identified patent and that said Letters Patent is hereby corrected as shown below:

<u>Title page,</u>
Item [30], the Foreign Application Priority Data should be deleted.

Signed and Sealed this

Twenty-first Day of January, 2003

JAMES E. ROGAN
*Director of the United States Patent and Trademark Office*